(12) United States Patent
Kaku

(10) Patent No.: US 9,360,072 B2
(45) Date of Patent: Jun. 7, 2016

(54) BRAKE MECHANISM AND CLUTCH UNIT

(71) Applicant: TS TECH CO., LTD., Asaka-shi, Saitama (JP)

(72) Inventor: Hiroyuki Kaku, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 14/368,661

(22) PCT Filed: Dec. 21, 2012

(86) PCT No.: PCT/JP2012/083314
§ 371 (c)(1),
(2) Date: Jun. 25, 2014

(87) PCT Pub. No.: WO2013/099813
PCT Pub. Date: Jul. 4, 2013

(65) Prior Publication Data
US 2015/0001033 A1   Jan. 1, 2015

(30) Foreign Application Priority Data

Dec. 26, 2011   (JP) .................................. 2011-284153
Dec. 26, 2011   (JP) .................................. 2011-284155

(51) Int. Cl.
| F16D 67/02 | (2006.01) |
| F16D 59/00 | (2006.01) |
| F16D 41/10 | (2006.01) |
| B60N 2/225 | (2006.01) |
| B60N 2/16 | (2006.01) |
| B60N 2/18 | (2006.01) |
| F16D 127/00 | (2012.01) |

(52) U.S. Cl.
CPC ................ *F16D 67/02* (2013.01); *B60N 2/167* (2013.01); *B60N 2/1882* (2013.01); *B60N 2/2258* (2013.01); *F16D 41/105* (2013.01); *F16D 59/00* (2013.01); *F16D 2127/004* (2013.01)

(58) Field of Classification Search
None
See application file for complete search history.

(56) References Cited

U.S. PATENT DOCUMENTS

| 2003/0001418 | A1* | 1/2003 | Baloche et al. | 297/344.12 |
| 2007/0137978 | A1* | 6/2007 | Yamada et al. | 192/223.2 |
| 2009/0272613 | A1* | 11/2009 | Kawai et al. | 192/45 |
| 2010/0175962 | A1* | 7/2010 | Kawai et al. | 192/16 |

FOREIGN PATENT DOCUMENTS

| JP | 3-14923 | 1/1991 |
| JP | 2002-120610 | 4/2002 |

(Continued)

*Primary Examiner* — Colby M Hansen
(74) *Attorney, Agent, or Firm* — Hamre, Schumann, Mueller & Larson, P.C.

(57) ABSTRACT

Provided is a brake mechanism including a brake-side outer race, a brake-side cam having an outer peripheral surface, a first movable piece disposed between the inner peripheral surface of the brake-side outer race and the outer peripheral surface of the brake-side cam, and a transmission member provided adjacent to the brake-side cam in an axial direction. The brake-side cam includes a plate-like main body and a first protrusion protruding from a side of the main body facing the transmission member. The first movable piece is disposed to have a portion thereof protruding beyond the side of the main body facing the transmission member. The transmission member is shaped like a flat plate, and includes a first opening configured to allow the first protrusion to be received and engaged therein and a second opening configured to allow the first movable piece to be received and engaged therein.

13 Claims, 10 Drawing Sheets

(56) References Cited

FOREIGN PATENT DOCUMENTS

| JP | 2003-166555 | 6/2003 |
| JP | 2010-25206 | 2/2010 |
| JP | 2010-127304 | 6/2010 |
| JP | 2011-153675 | 8/2011 |
| JP | 2011-163542 | 8/2011 |

* cited by examiner

FIG.2
(a)
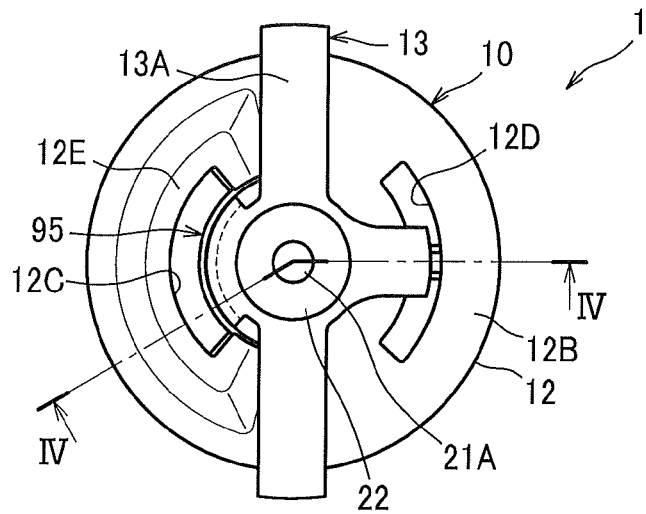
(b)
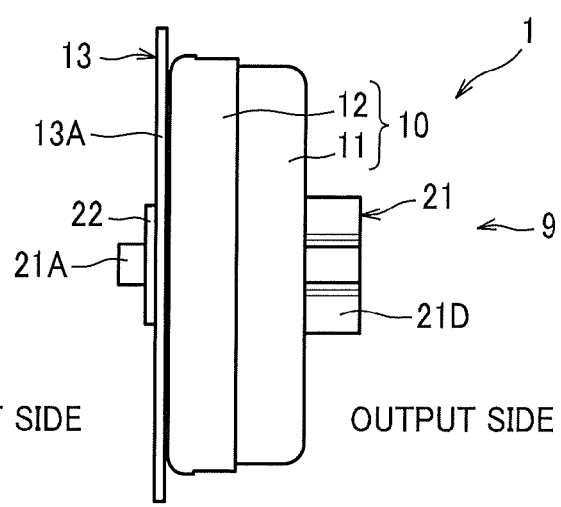
INPUT SIDE          OUTPUT SIDE
(c)
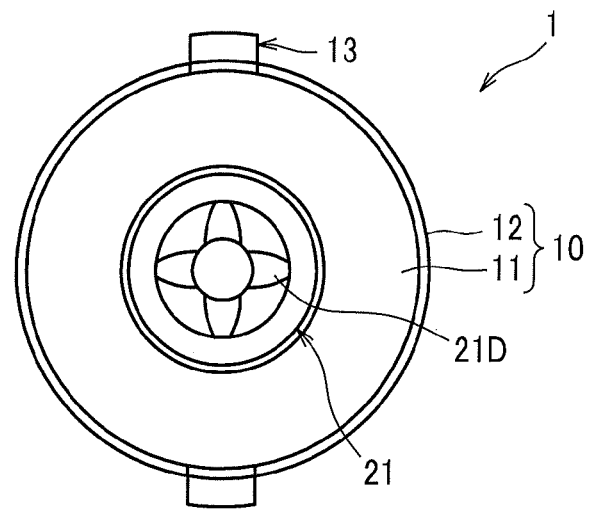

FIG.5
(a)
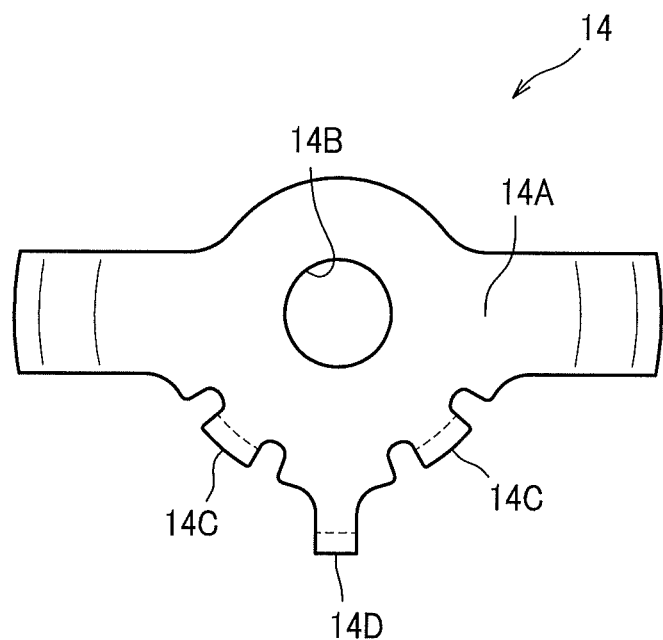
(b)
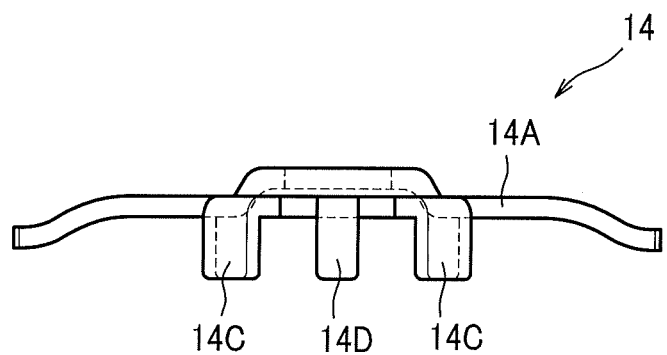

BRAKE MECHANISM AND CLUTCH UNIT

TECHNICAL FIELD

The present invention relates to a brake mechanism and a clutch unit for use in a height adjustment mechanism for a vehicle seat, or the like.

BACKGROUND ART

In a height adjustment mechanism for a vehicle seat, a clutch unit is used which is configured such that an output shaft is rotated by an operation of turning up and down a lever provided at an input side thereof but is not rotated even when a force which is derived from the weights of the seat and an occupant and by which the seat is biased downward is applied to the output shaft.

In such a clutch unit, a ratchet mechanism configured to transmit a driving force to the output shaft when the lever is moved from a neutral position upward or downward but not to transmit the driving force when the lever is moved from an upper or lower position back to the neutral position, and a brake mechanism configured to transmit an input torque received from the ratchet mechanism to the output shaft but not to transmit a reverse input torque received from the output shaft to the ratchet mechanism are provided. In the clutch unit, a return spring for returning the lever to the neutral position is provided (Patent Literatures 1, 2).

Further, in the brake mechanism, an outer race having a cylindrical inner peripheral surface and a cam having an outer peripheral surface nonparallel to this inner peripheral surface are provided, and rollers are arranged between the inner peripheral surface of the outer race and the outer peripheral surface of the cam. Spaces between the inner peripheral surface of the outer race and the outer peripheral surface of the cam provide wedge-like spaces each shaped to be narrower toward outer sides in the circumferential direction; the rollers as held fast between the outer peripheral surface and the inner peripheral surface serves to shut off the transmission of the reverse input torque received from the output shaft. In order to release this brake, a transmission member (e.g., connection member 15 in FIG. 8 of Patent Literature 2) configured to push the rollers in the circumferential directions while engaging with the cam is employed.

CITATION LIST

Patent Literature

Patent Literature 1: JP 2011-153675 A
Patent Literature 2: JP 2011-163542 A

The conventional clutch unit is configured to have its essential parts of the clutch mechanism and the ratchet mechanism (i.e., where parts are assembled in such an engageable manner as to achieve transmission and shutoff of torque) enclosed in a housing, while the return spring is exposed to the outside of the housing. Accordingly, there has been the potential for the return spring to allow foreign matter to be adhered thereto and to allow string-like matter to be tangled therewith, which would disadvantageously lead to malfunction.

On the other hand, there is a need for the clutch unit to be made smaller in size and lighter in weight while ensuring that a sufficient braking force is produced against the input force received by the output shaft.

In particular, the conventional transmission member should have an elongate portion extending into the cam side so provided as to come in contact with the rollers, and should disadvantageously be designed to be large in size in the axial direction.

SUMMARY OF INVENTION

It is one aspect of the present invention to implement a clutch unit in which a return spring can be protected from foreign matter which could otherwise be adhered thereto. It is another aspect of the present invention to provide a clutch unit which has reduced size and weight with a sufficient braking force ensured. It is yet another aspect of the present invention to provide a brake mechanism with a brake-releasing transmission member made thinner in shape and lighter in weight.

According to one embodiment, a brake mechanism for transmitting an input torque to an output shaft and shutting off a reverse input torque from the output shaft is disclosed. This brake mechanism comprises: a brake-side outer race having a cylindrical inner peripheral surface; a brake-side cam configured to be rotatable relative to the brake-side outer race, the brake-side cam having an outer peripheral surface nonparallel to the inner peripheral surface of the brake-side outer race; a first movable piece disposed between the inner peripheral surface of the brake-side outer race and the outer peripheral surface of the brake-side cam, and configured to shut off the reverse input torque from the output shaft by getting held between the inner peripheral surface of the brake-side outer race and the outer peripheral surface of the brake-side cam; and a transmission member provided adjacent to the brake-side cam in an axial direction, allowed to come in contact with the first movable piece to thereby release the first movable piece from a state of being held between the inner peripheral surface of the brake-side outer race and the outer peripheral surface of the brake-side cam, and allowed to get engaged with the brake-side cam to thereby transmit the input torque to the brake-side cam, wherein the brake-side cam includes a plate-like main body and a first protrusion protruding from a side of the main body facing the transmission member, wherein the first movable piece is disposed to have a portion thereof protruding beyond the side of the main body facing the transmission member, and wherein the transmission member is shaped like a flat plate having a first opening configured to allow the first protrusion to be received and engaged therein and a second opening configured to allow the first movable piece to be received and engaged therein.

With this configuration, the brake-side cam has formed therein the first protrusion protruding therefrom into the transmission member, and the first movable piece is disposed to protrude into the transmission member; this makes it possible to have the transmission member shaped like a flat plate. That is to say, the transmission member does not have to have a portion extending in the axial direction, and thus the thickness can be reduced and the weight can be reduced. The axial direction herein refers to a direction of the axis of rotation of the brake-side cam.

In the above-described brake mechanism, the first opening and the second opening may preferably be each formed as a recess that opens to a radially outside of the transmission member at an outer periphery of the transmission member.

If the first opening and the second opening are, as in this configuration, formed at the outer periphery of the transmission member, the turning radius of the position along the first opening with which the first protrusion is brought into contact can be increased, and thus a force applied to the perimeter around the first opening can be reduced. As a result, the thickness of the transmission member can be reduced.

In the above-described brake mechanism, the first opening and the second opening may be provided respectively at two or more positions and arranged alternately in a circumferential direction.

With this configuration, the force received by the transmission member upon actuation is well balanced so that the smoothness of the rotation of the transmission member can be improved.

In this configuration, the first opening and the second opening at the respective positions may be of equal length in the circumferential direction and are arranged at regular angular intervals in the circumferential direction.

With this configuration, the first openings and the second openings are substantially the same as one another; accordingly, improper orientation of the transmission member in assembly when the transmission member is mounted to the brake-side cam can be avoided.

According to another embodiment of the present invention, a clutch unit comprising a brake mechanism as described above and a ratchet mechanism capable of transmitting and shutting off an input torque to the brake mechanism selectively according to an operation of an operation member is provided. In this clutch unit, the ratchet mechanism comprises: a first rotatory member provided adjacent to the transmission member in the axial direction and configured to be engageable with and rotatable together with the transmission member; a second rotatory member configured to be swingable together with the operation member; and a second movable piece configured to be engageable with and disengageable from the first rotatory member and the second rotatory member to thereby transmit and shut off the input torque, wherein the transmission member has an engageable hole which opens to at least one side facing the first rotatory member, and wherein the first rotatory member includes a second protrusion engageable in the engageable hole.

With this configuration, the transmission member and the first rotatory member can be engaged with each other by making use of the engageable hole and the second protrusion; accordingly, the transmission member can be shaped like a plate. That is, the transmission member can be made thinner so that the weight can be reduced.

In this clutch unit, the engageable hole may preferably be disposed in positions radially inwardly of the first opening and the second opening.

With this configuration, the transmission member can be downsized.

In the above-described clutch unit, the first rotatory member may be configured as a ratchet-side outer race made of sheet metal shaped like a cup with a cylindrical inner peripheral surface, and the second rotatory member may be configured as a ratchet-side cam having an outer peripheral surface nonparallel to the inner peripheral surface of the ratchet-side outer race.

With this configuration, the structure of the first rotatory member can be simplified so that the cost can be cut down, while the second rotatory member can be designed to be smaller.

According to yet another embodiment of the present invention, a clutch unit comprising a ratchet mechanism provided at an input side and configured to transmit and shut off an input torque produced by a swinging motion of an operation member to which a lever is mounted, and a brake mechanism provided at an output side and configured to transmit the input torque from the ratchet mechanism to an output shaft and to shut off a reverse input torque from the output shaft is disclosed. In this clutch unit, the brake mechanism includes a brake-side cam, a brake-side outer race, a first movable piece configured to be engageable with and disengageable from the brake-side cam and the brake-side outer race to thereby lock and unlock rotation of the brake-side cam, and a transmission member allowed to come in contact with the first movable piece to thereby release the first movable piece from the brake-side cam and the brake-side outer race, and allowed to get engaged with the brake-side cam to thereby transmit the input torque to the brake-side cam, wherein the ratchet mechanism includes a first rotatory member configured to be rotatable together with the transmission member, a second rotatory member configured to be swingable together with the operation member, and a second movable piece configured to be engageable with and disengageable from the first rotatory member and the second rotatory member to thereby transmit and shut off the input torque from the operation member, and wherein the clutch unit comprises: a return spring configured to return the operation member to a neutral position; and a housing covering the first movable piece, the second movable piece and the return spring from at least one side that is a radially outside thereof.

With this configuration, not only the first movable piece and the second movable piece but also the return spring are covered by the housing from at least one side that is a radially outside thereof, and thus the risk of adhering foreign matter to the return spring can be suppressed. Moreover, the risk of allowing string-like matter to be entangled with the return spring can be suppressed. Furthermore, since the return spring is covered by the housing which covers the first movable piece and the second movable piece, advantageously in comparison with an alternative configuration in which another dedicated housing separate from the housing covering the first and second movable pieces is configured separately, the number of parts can be reduced and the size and weight can be reduced.

In the above-described clutch unit, the housing may preferably be configured to double as the brake-side outer race.

With this configuration, the number of parts can be reduced so that the weight is reduced.

In this clutch unit, the housing may preferably configured to comprise: the brake-side outer race configured to cover an output-side surface of the first movable piece and to cover a radially outer side of the brake-side cam and the first movable piece; and a cover member configured to be fitted on an outer periphery of the brake-side outer race and to cover an input-side surface of the second movable piece.

With this configuration in which the cover member is fitted on the outer periphery of the brake-side outer race, the outer periphery of the brake-side outer race is reinforced by the cover member, so that the deformation of the brake-side outer race in the radial direction can be suppressed and the braking force can be increased.

In this clutch unit, the cover member may preferably be configured to restrict movement of the second movable piece toward the input side.

With this configuration in which the movement of the second movable piece toward the input side is restricted by the cover member, advantageously in comparison with an alternative configuration in which another part is used for this purpose, the thickness in the axial direction can be suppressed and the size can be reduced.

In each of the above-described clutch units, the operation member may preferably be configured to consist of one part and to include a second rotatory member located within the housing, a lever mount portion which is disposed outside the housing and to which the lever is mounted, and a connecting portion configured to connect the second rotatory member and the lever mount portion and disposed across inside and outside of the housing.

With this configuration, the number of parts can be reduced, and compactness in design can be achieved.

In this clutch unit, the lever mount portion may preferably be configured to extend to a radially outside position beyond the outer periphery of the housing.

With this configuration, a distal end of the lever mount portion is located at a greater distance from the axis of the swinging motion, and thus the transmission of the torque from the lever mounted on the lever mount portion, to the lever mount portion becomes more effective. Therefore, as the load imposed on the lever is small, the lever can have an increased durability even when the lever is made of resin.

In the configuration wherein the operation member includes the connecting portion, the return spring may be held by the connecting portion.

With this configuration, the operation member is made multifunctional so that the number of parts can be reduced.

In this clutch unit, the operation member may be configured to include a spring support portion disposed inside the housing, on a side opposite to the connecting portion with respect to an axis of a swinging motion thereof, wherein both ends of the return spring are retained on the spring support portion.

With this configuration, adhesion of foreign matter to an end of the return spring can be suppressed with a simple construction.

BRIEF DESCRIPTION OF DRAWINGS

FIG. 2 are views of the clutch unit which includes (a) a front elevation showing a view from an input side, (b) a side elevation, and (c) a rear elevation showing a view from an output side.

FIG. 5 includes (a) a front elevation and (b) a side elevation of a posture restricting member.

DESCRIPTION OF EMBODIMENTS

Figure 1:
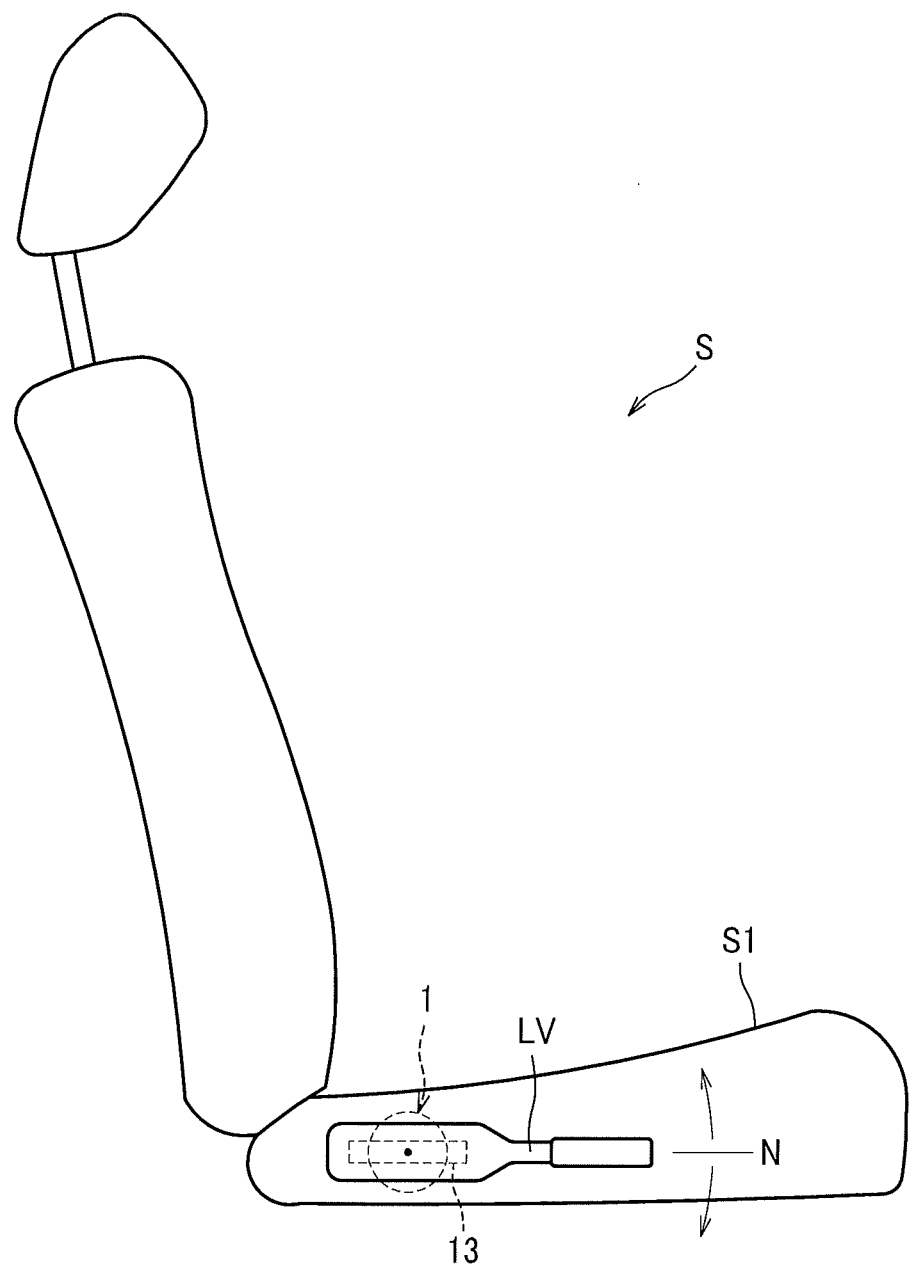
FIG. 1 is a side elevation of a vehicle seat provided with a clutch unit.

Hereafter, a detailed description will be given of an embodiment of the present invention with reference made to the drawings where appropriate. As shown in FIG. 1, a clutch unit 1 consistent with the present invention is applied to a known height adjustment mechanism (not shown) for adjusting the height of a seat cushion S1 of a vehicle seat S. The clutch unit 1 is provided with a lever member 13 as one example of an operation member to which a lever LV is mounted, and configured to activate the height adjustment mechanism by causing an output gear 21D (see FIG. 2) which will be described later as an output shaft to rotate in accordance with the operation of the lever LV so that the height of the seat cushion S1 can be adjusted. To be more specific, when the lever LV is raised from a neutral position N, the seat cushion S1 is moved up by a predetermined amount; on the other hand, when the lever LV is lowered from the neutral position N, the seat cushion S1 is moved down by a predetermined amount. It is also configured such that when the lever LV is returned from the upper or lower position to the neutral position N, the output gear 21D will not rotate.

As shown in FIG. 2(a)-(c), the clutch unit 1 includes a housing 10 and several members housed therein and only a portion of the main shaft 21 with the output gear 21D provided thereon and the lever member 13 protrude from the housing 10. Accordingly, respective parts in the clutch unit 1 are protected from foreign matter which would otherwise be adhered thereto, and the risk of tangling a string-like matter which a passenger may carry on the respective parts is reduced. In the following description, as shown in FIG. 2(b), a side on which the lever member 13 is provided is referred to as "input side", while a side on which the output shaft 21D is provide is referred to as "output side".

Figure 3:
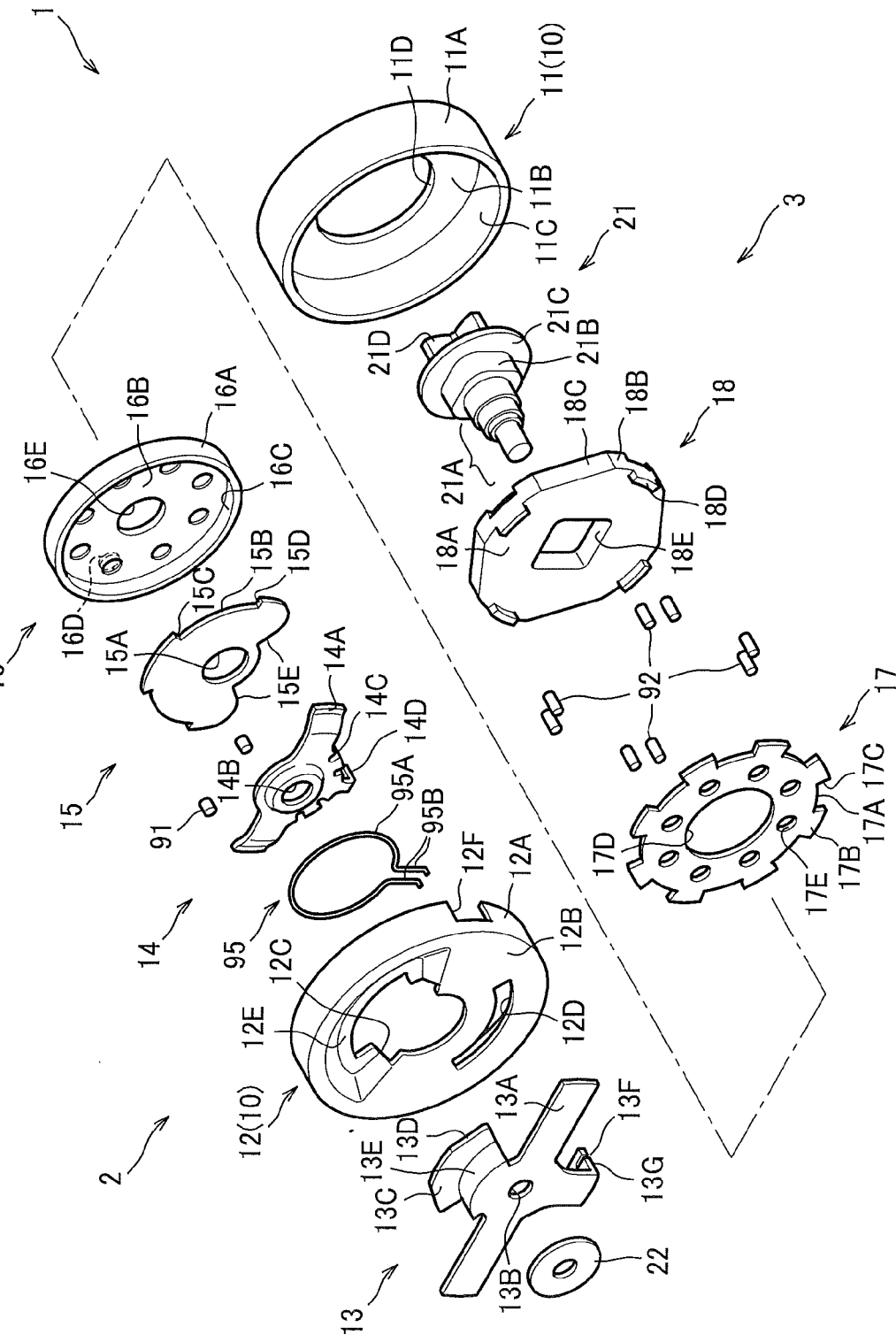
FIG. 3 is an exploded perspective view of the clutch unit.

As shown in FIG. 3, the clutch unit 1 includes a ratchet mechanism 2 provided at the input side and configured to transmit and shut off an input torque produced by a swinging motion of the lever member 13, and a brake mechanism 3 provided at the output side and configured to transmit the input torque received from the ratchet mechanism 2 to the output gear 21D and to shut off a reverse input torque received from the output gear 21D.

Components of the ratchet mechanism 2 and the brake mechanism 3 will now be outlined. The ratchet mechanism 2 includes a cover member 12, a lever member 13, a posture restricting member 14, a roller retainer 15, a ratchet-side outer race 16, rollers 91, and a return spring 95 as a biasing member. The brake mechanism 3 includes a brake-side outer race 11, a brake-side cam 18, a transmission member 17, and rollers 92. The main shaft 21 transmits rotation of the brake-side cam 18 to the outside, and supports rotation in the ratchet mechanism 2. The aforementioned housing 10 is configured as an assembly of the brake-side outer race 11 and the cover member 12. In other words, the housing 10 doubles as the brake-side outer race 11. The main shaft 21 deriving power from the brake mechanism 3 includes a support shaft portion 21A with portions of different diameters, a rotatory engageable shaft portion 21B that is rectangular in cross section, a flange 21C, and an output gear 21D arranged in this sequence from the input side to the output side.

Figure 4:
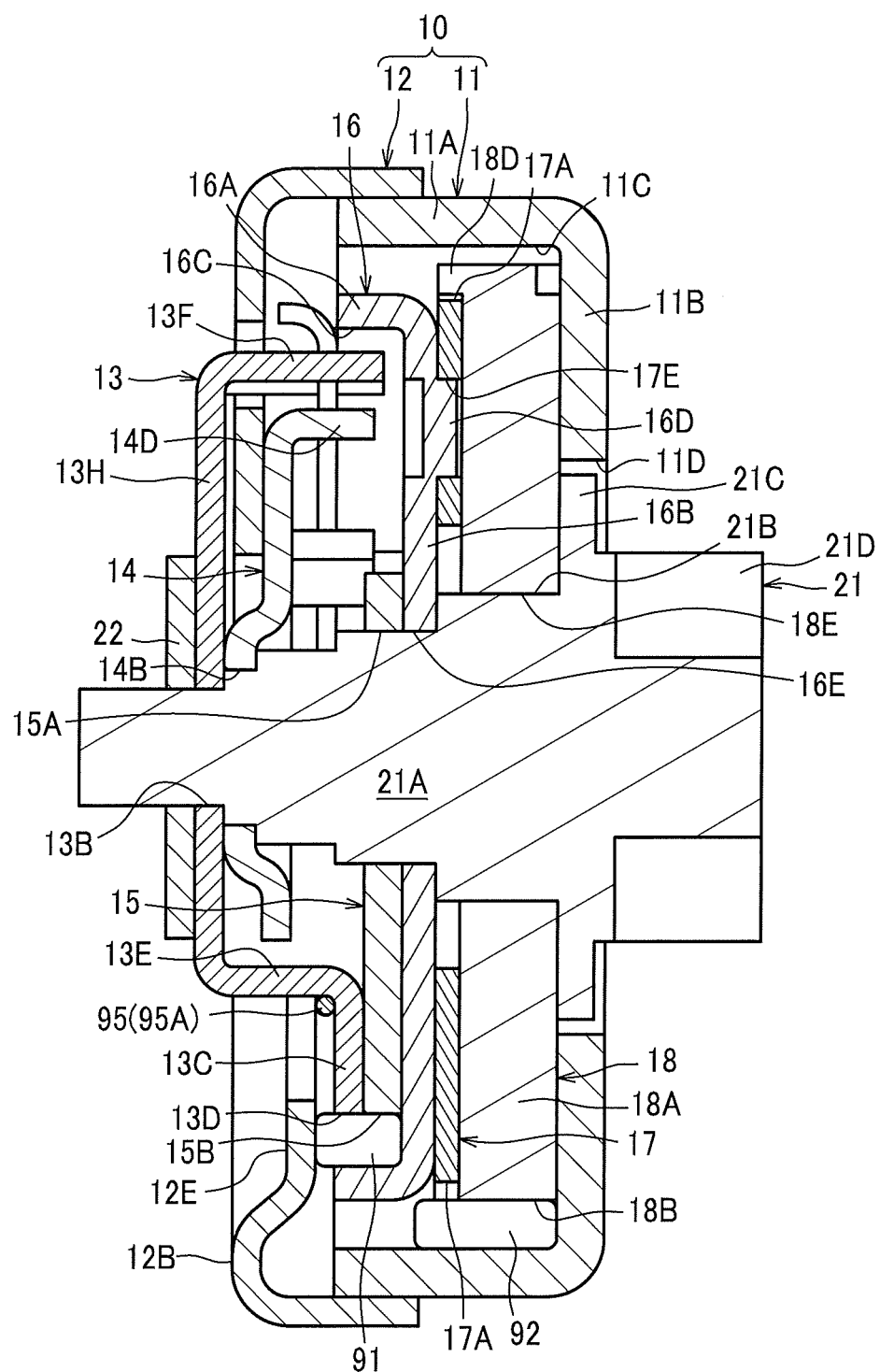
FIG. 4 is sectional view taken along line IV-IV of FIG. 2.

Next, the constructions of the brake mechanism 3 and the ratchet mechanism 2 will be described in detail. The brake-side outer race 11 includes a cylindrical outer peripheral portion 11A, and an output-side sidewall 11B connected to this outer peripheral portion 11A. An inner peripheral surface 11C of the brake-side outer race 11 is a cylindrical surface. The sidewall 11B has a hole 11D a diameter of which is substantially equal to that of the flange 21C of the main shaft 21. As shown in FIG. 4, the flange 21C is disposed inside the hole 11D, to narrow the interstice between the main shaft 21 and the brake-side outer race 11, so that entry of foreign matter into the housing 10 is suppressed.

Referring back to FIG. 3, the brake-side cam 18 has a thickness generally equal to but slightly smaller than the length of the rollers 92 in the axial direction, and can be rotated relative to the brake-side outer race 11 when the lever LV is operated. The brake-side cam 18 includes a plate-like main body 18A and first protrusions 18D. An outer peripheral surface of the main body 18A is configured to have circular outer peripheral surfaces 18B each having a circular cross section and flat cam surfaces 18C arranged alternately in the circumferential direction. The cam surfaces 18C are arranged in four positions spaced at regular intervals in the circumferential direction. The cam surfaces 18C are surfaces nonparallel to the inner peripheral surface 11C of the brake-side outer race 11, and a wedge-like space 81 (see FIG. 8) formed between the inner peripheral surface 11C and each cam surface 18C is configured to be narrower in its size in the radial direction from the center toward outer side in the circumferential direction. In other words, the wedge-like space 81 is shaped like a wedge which tapers toward ends at both sides in the circumferential direction.

The first protrusion 18D is a small projection formed to protrude toward the transmission member 17 side (i.e., input side), and arranged in the circumferential direction at positions of the outer periphery corresponding to the circular outer peripheral surfaces 18B. The amount of protrusion of the first protrusion 18D is preferably not smaller than, and more preferably substantially equal to, the thickness of the transmission member 17. With this configuration, the force imposed by the transmission member 17 to engaging portions of the brake-side cam 18 becomes smaller so that the burden placed thereon becomes smaller, and the first protrusions 18D do not excessively protrudes out so that the weight can be reduced. The first protrusions 18D may be formed by half blanking with low cost. Since this processing method is adopted, a recess corresponding to the first protrusion 18D is provided at a back side (output side) of the first protrusion 18D. In the center of the main body 18A, a rotary engageable hole 18E that is rectangular in cross section is formed. The rotary engageable hole 18E has a shape corresponding to that of the rotary engageable shaft portion 21B, and is fitted on the rotary engageable shaft portion 21B as shown in FIG. 4. Accordingly, the brake-side cam 18 and the main shaft 21 rotate together.

Turning back to FIG. 3, the roller 92 as one example of a first movable piece is a member configured to be engageable with and disengageable from the brake-side cam 18 and the brake-side outer race 11 to thereby lock and unlock rotation of the brake-side cam 18. A pair of rollers 92 are put in each wedge-like space 81 formed between the brake-side outer race 11 and the brake-side cam 18, and a spring 96 is disposed between the rollers 92 in pair. The spring 96 normally presses the rollers 92 in pair so as to separate them from each other, and the rollers 92 are therefore pushed into the narrowed sides of the wedge-like space 81; in an unoperated state (i.e., when the lever LV is in the neutral position N), the rollers 92 are held between the inner peripheral surface 11C of the brake-side outer race 11 and the cam surface 18C of the brake-side cam 18. Accordingly, even if a reverse input torque is applied to the output gear 21D and exerts a force which would cause the brake-side cam 18 to rotate relative to the brake-side outer race 11, either of the rollers 92 in pair is pressed into the narrowed sides of the wedge-like space 81 and prohibited from rotating. In short, the reverse input torque from the output gear 21D is shut off.

As shown in FIG. 4, the roller 92 is configured to have a length slightly greater than the thickness of the main body 18A of the brake-side cam 18, and provided to have a portion thereof protruding beyond the end of the brake-side cam 18 into the input side. To be more specific, the roller 92 protrudes from the main body 18A to such an extent that its perfectly cylindrical surface not including its rounded edge covers the entire width of the transmission member 17 in the axial direction. The output-side end face and the radially outside (in the direction of radius of the main shaft 21) of the roller 92 are covered by the brake-side outer race 11.

Referring back to FIG. 3, the transmission member 17 is a member allowed to come in contact with the roller 92 to thereby release the rollers 92 from the brake-side cam 18 and the brake-side outer race 11 (releasing the state of being held between the brake-side cam 18 and the brake-side outer race 11), and allowed to get engaged with the brake-side cam 18 to thereby transmit the input torque derived from the ratchet mechanism 2 to the brake-side cam 18. The transmission member 17 has a shape of a thin flat plate, and is disposed adjacent to the input side relative to the main body 18A of the brake-side cam 18 and provided in contact with the main body 18A. The transmission member 17 has eight recesses 17A, shaped substantially like rectangles, which opens to a radially outside at an outer periphery thereof. The remaining portions of the outer periphery of the transmission member 17 at which the recesses 17A are not provided are configured as large-diameter portions 17B each having a circular peripheral surface. A step riser portion 17C of the recess 17A provided adjacent to each of the large-diameter portions 17B serves to engage with the roller 92 to thereby unlock the brake-side cam 18 or to engage with the first protrusion 18D to thereby transmit the input torque to the brake-side cam 18.

Figure 8:
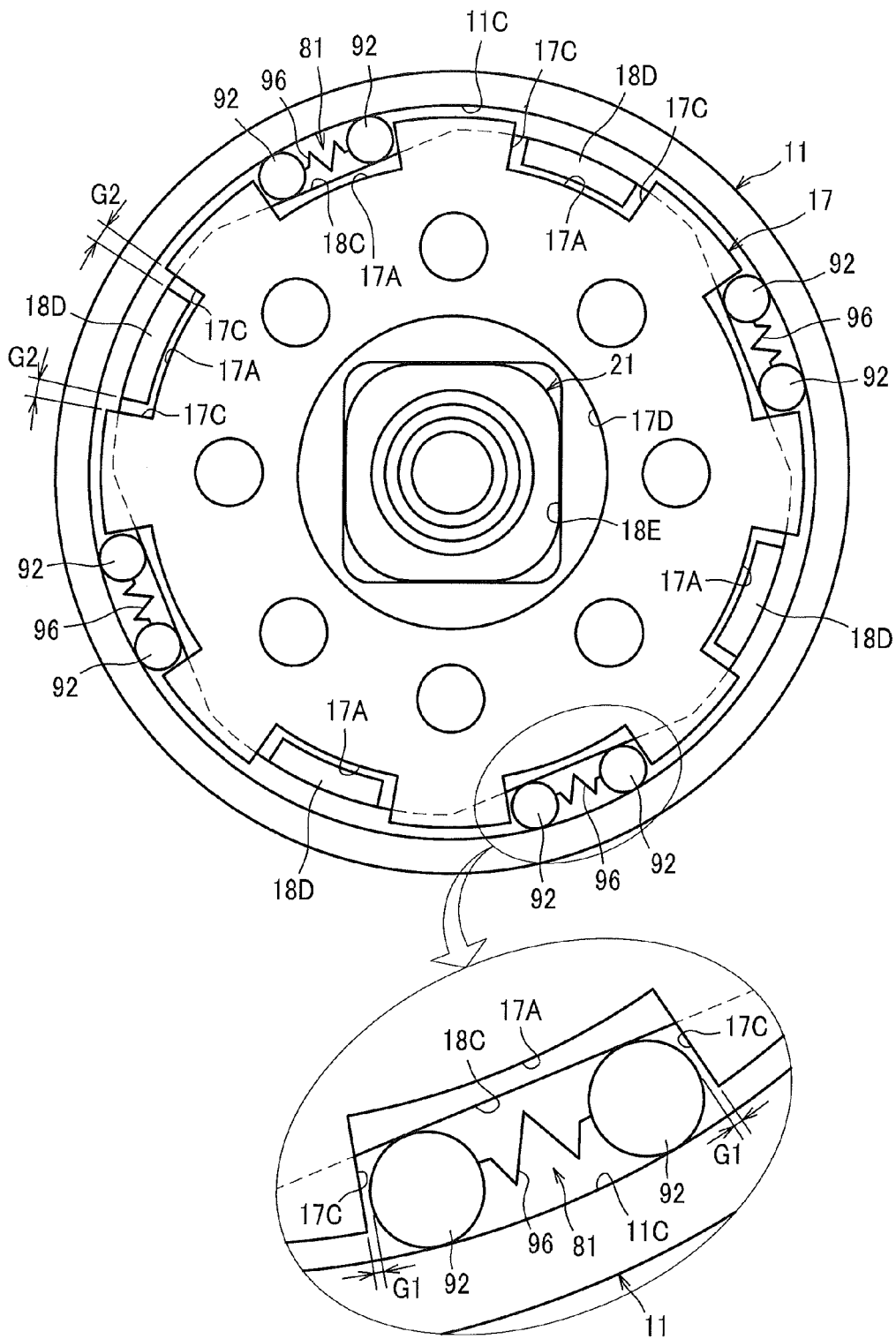
FIG. 8 is a front elevation of an assembly of a main shaft, a brake-side outer race, a brake-side cam, a transmission member, rollers and springs.

The recesses 17 have the same sizes in the circumferential direction, and arranged at regular intervals in the circumferential direction. As shown in FIG. 8 and FIG. 4, four of the recesses 17A provided at an angle of 90 degrees receive the rollers 82, and the remaining four receive the first protrusions 18D of the brake-side cam 18. In FIG. 4, engagement between the first protrusion 18D and the recess 17A are shown by illustrating a section shifted from the line IV-IV of FIG. 2.

In the present embodiment, the first opening configured to allow the first protrusion 18D to be received and engaged therein and the second opening configured to allow the first movable piece (roller 92) to be received and engaged therein according to the present invention are both embodied by the recesses 17A. Since the first opening and the second opening are, as described above, found at the outer periphery of the transmission member 17, that is, provided in positions that are the farthest from the center of the main shaft 21, the turning radius of the position along the first opening with which the first protrusion is brought into contact can be increased. Therefore, a force applied to the perimeter around the first opening (i.e., to the step riser portion 17C) can be reduced, and the thickness of the transmission member 17 can be reduced.

The first openings (recesses 17A in which the first protrusions 18D are received) and the second openings (recesses 17A in which the rollers 92 are received) are, in the present embodiment, arranged alternately in the circumferential direction. Therefore, the force received by the transmission member 17 as actuated is well balanced so that the smoothness of the rotation of the transmission member 17 can be improved. Moreover, the first openings and the second openings are embodied in the form of recesses 17A configured to be substantially the same as one another; therefore, when the transmission member 17 is mounted to the brake-side cam 18, the necessity of selecting proper recesses 17A to be engaged with the first protrusions 18D is obviated, and thus improper orientation of the transmission member 17 in assembly can be prevented.

In the unactuated state, the rollers 92 are in contact with the inner peripheral surface 11C of the brake-side outer race 11 and the cam surfaces 18C of the brake-side cam 18, but are slightly separate from the step riser portions 17C of the transmission member 17. The distance G1 between the step riser portion 17C and the roller 92 is smaller than the distance G2 in the circumferential direction between the step riser portion 17C of the recess 17A in which the first protrusion 18D is received and the first protrusion 18D.

Referring back to FIG. 3, the transmission member 17 has formed in its center a through hole 17D in which the main shaft 21 is disposed. In addition, the transmission member 17 has engageable holes 17E pierced on a radially inner side of the recess 17A. The engageable holes 17E are arranged circumferentially at regular intervals.

The ratchet-side outer race 16 is one example of a first rotatory member provided adjacent to the transmission member 17 at the input side in the axial direction, configured to be rotatable together with the transmission member 17, and made of sheet metal and shaped like a cup. The ratchet-side outer race 16 includes a cylindrical outer peripheral portion 16A and an output-side sidewall 16B connected to this outer peripheral portion 16A. An inner peripheral surface 16C of the ratchet-side outer race 16 is a cylindrical surface. The sidewall 16B includes a second protrusion 16D formed by half blanking, protruding toward the output side. The second protrusion 16D is provided with its size and position so determined as to correspond to those of an engageable hole 17E, and engaged with engageable hole 17E as shown in FIG. 4. The ratchet-side outer race 16 and the transmission member 17 are thus configured to rotate together. In the center of the ratchet-side outer race 16, a circular hole 16E is formed such that the ratchet-side outer race 16 is rendered rotatable relative to the main shaft 21 and the housing 10 as the hole 16E is fitted on the support shaft portion 21A.

The roller retainer 15 is a member for retaining the rollers 91 in predetermined positions along the inner periphery of the ratchet-side outer race 16. The roller retainer 15 has a circular hole 15A such that the roller retainer 15 is located in place relative to the main shaft 21 as the hole 15A is fitted on the support shaft portion 21A. Along an upper half in FIG. 3 of an outer periphery of the roller retainer 15, arc-shaped roller retaining portions 15B are formed which are at a distance slightly greater than the diameter of each roller 91 away from the inner peripheral surface 16C of the ratchet-side outer race 16. The roller retaining portions 15B are formed in two locations; at an upper end of each roller retaining portion 15B is provided a roller retaining wall 15C extending radially outward and at a lower end of each roller retaining portion 15B is provided a spring support wall 15D extending radially outward. Also in the roller retainer 15, two posture restricting walls 15E are formed, which extend from the center in obliquely downward directions in FIG. 3 to the right and to the left, respectively.

Figure 7:
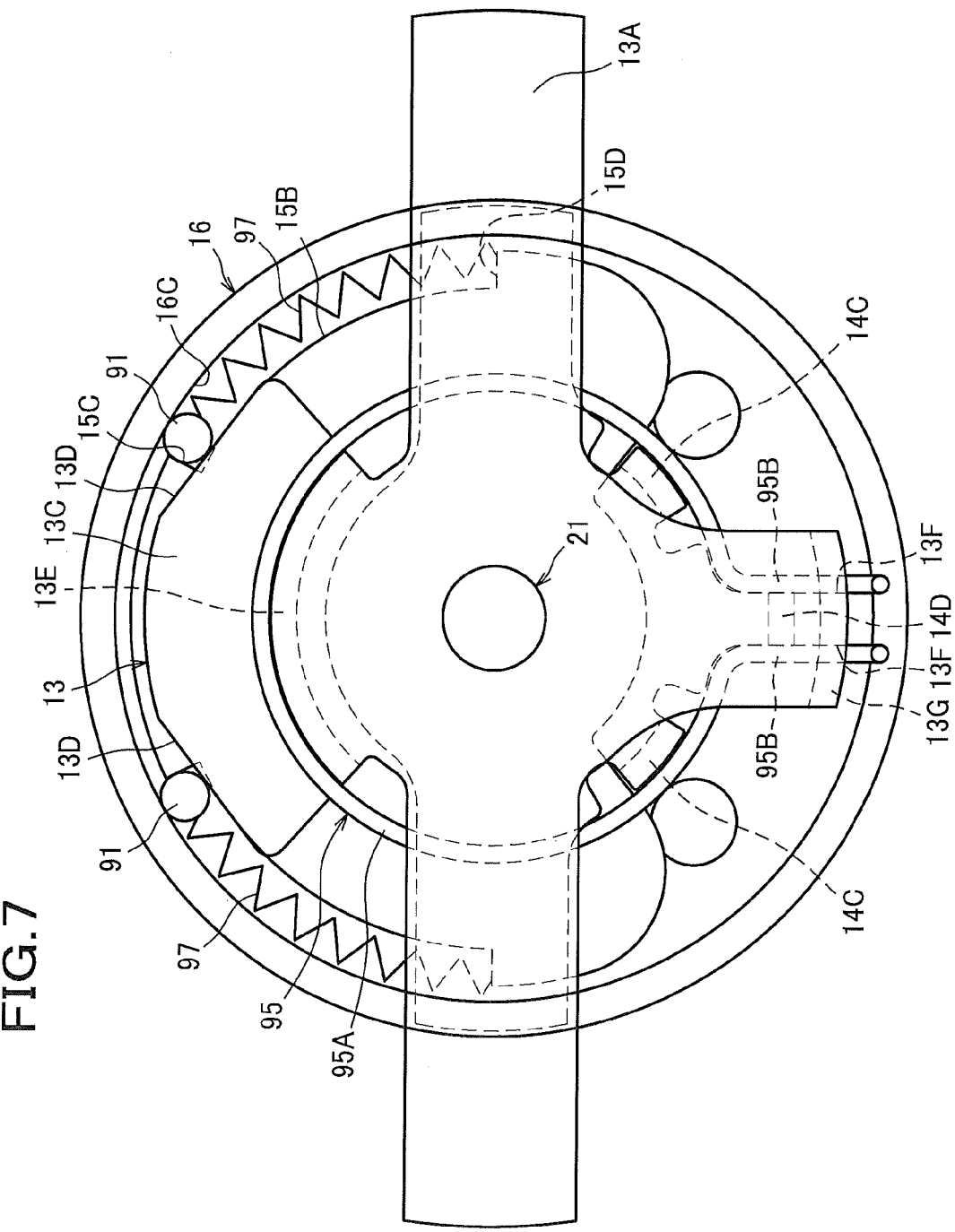
FIG. 7 is a front elevation of an assembly of a main shaft, a ratchet-side outer race, a roller retainer, a posture restricting member, rollers, springs, a return spring and a lever member.

As shown in FIG. 7, each roller 91 is located in a region adjacent to the roller retaining wall 15C within the space between the roller retaining portion 15B and the inner peripheral surface 16C of the ratchet-side outer race 16. The roller 91 is a member configured to be engageable with and disengageable from the ratchet-side outer race 16 and a ratchet-side cam 13C which will be described later, to thereby transmit and shut off the input torque from the lever member 13. A spring 97 is disposed between the roller 91 and the spring support wall 15D, and the roller 91 is always biased by the spring 97 toward the roller retaining wall 15C.

As shown in FIGS. 3 and 5, the posture restricting member 14 is a member for restricting the posture of the roller retainer 15 to a fixed position relative to the housing 10. The posture restricting member 14 includes a radially extending main body arm 14A, a hole 14B, spring retaining portions 14C, and a spring support portion 14D. The hole 14B is provided in the center of the main body arm 14A. The spring retaining portions 14C are configured to extend from the main body arm 14A in its positions facing in directions shifted 45 degrees from the downward direction in FIG. 3, to the output side (toward the roller retainer 15). The spring retaining portions 14C are engaged with the posture restricting walls 15E of the roller retainer 15, so that the roller retainer 15 and the posture restricting member 14 may not shift from each other in the circumferential direction around the axis of the main shat 21 (i.e., the direction of rotation). The spring support portion 14D is configured to extend from a lower portion of the main body arm 14A to the output side.

The cover member 12 is configured to include a cylindrical outer peripheral portion 12A, and an input-side sidewall 12B connected to this outer peripheral portion 12A. In the sidewall 12B, an operational opening 12C which broadens from the center toward its upper end in FIG. 3 is provided. Also, in a lower half region of the sidewall 12B, a spring engaging opening 12D which extends laterally in an arcuate form is provided. In the sidewall 12B, a portion along an upper edge of the operational opening 12C is configured as a recess 12E which is recessed toward the output side. The portion of the sidewall 12B which constitutes the recess 12E covers the input-side surfaces of the rollers 91 to thereby restrict movement of the rollers 91 toward the input side (see FIG. 4). With this configuration in which the cover member 12 serves to restrict movement of the rollers 91 toward the input side, advantageously in comparison with an alternative configuration in which another part is used for this purpose, the thickness in the axial direction is reduced so that the downsizing of the clutch unit 1 is achieved. In two locations, right and left, (of which only one is seen in FIG. 3) of the outer peripheral portion 12A, recesses 12F which opens to the output side are provided.

The cover member 12 with its outer peripheral portion 12A being fitted on the outside of the outer peripheral portion 11A of the brake-side outer race 11 is welded or otherwise joined to the brake-side outer race 11 into one piece. The end portions of the main body arms 14A are engaged in the respective recesses 12F of the cover member 12, whereby the posture restricting member 14 and the roller retainer 15 are fixed in posture, so as not to make angular displacements, relative to the housing 10. In other words, the roller retainer 15 is an immovable member which is not caused to rotate relative to the housing 10 by the operation of the lever LV.

Figure 6:
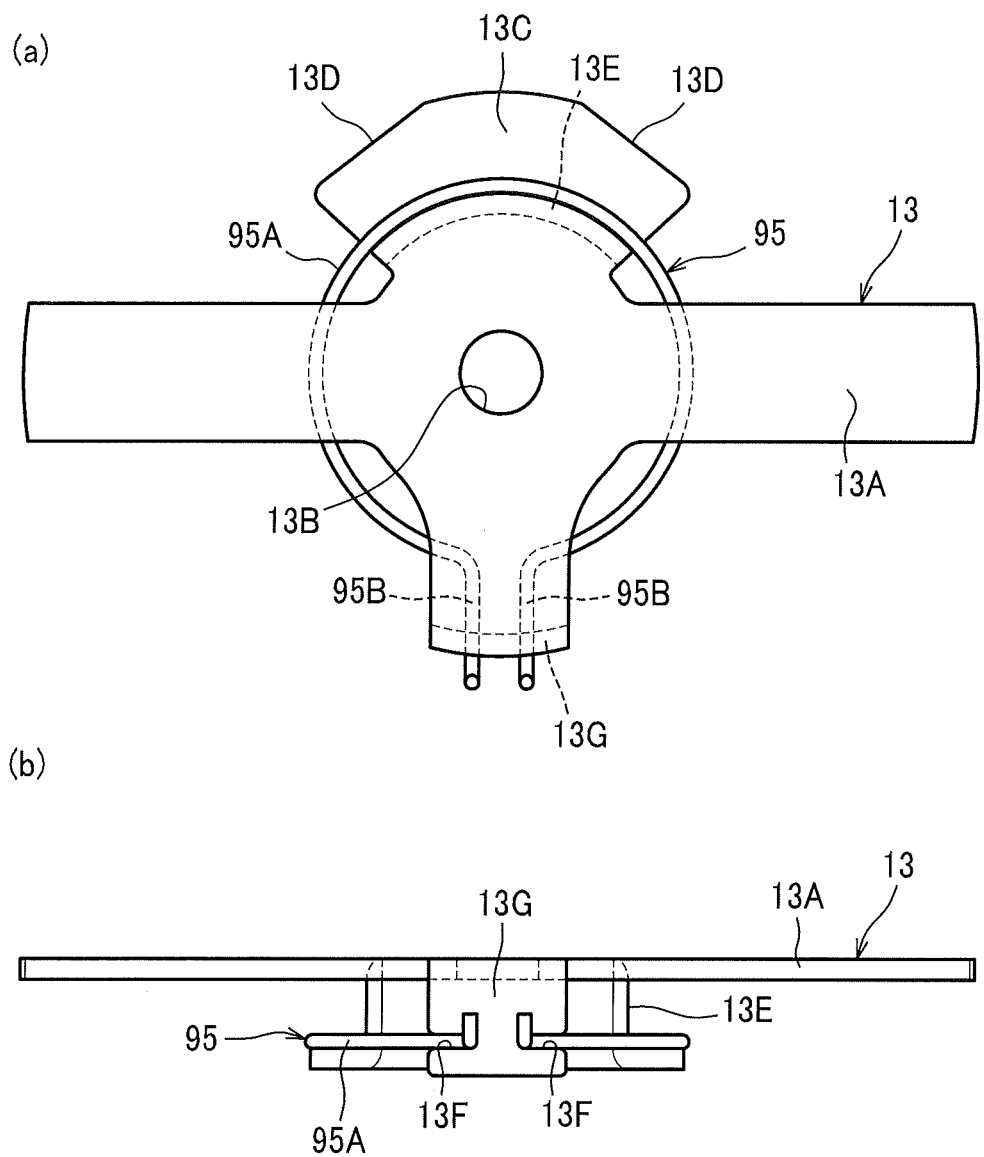
FIG. 6 includes (a) a front elevation and (b) a side elevation of an assembly of a lever member and a return spring.

As shown in FIGS. 3 and 6, the lever member 13 includes a lever mount portion 13A, a ratchet-side cam 13C, a connection portion 13E and a spring support portion 13G.

The lever mount portion 13A is disposed outside the housing 10. The lever mount portion 13A is a portion which extends from the center to the left and to the right as in FIG. 3, and to which the lever LV is mounted. In the center of the lever mount portion 13A, a circular hole 13B is provided; the hole 13B is fitted on the support shaft portion 21A so that the lever mount portion 13A can swing relative to the housing 10.

The lever mount portion 13A extends radially outward beyond the periphery of the housing 10, i.e., beyond the outer peripheral portion 12A of the cover member 12. Therefore, the ends of the lever mount portion 13A are distanced far away from the center of its swinging motion, and when the lever LV is mounted to the lever mount portion 13A, the rotation torque can be transmitted effectively from the lever LV to the lever mount portion 13A. Consequently, a reaction force applied from the lever mount portion 13A to the lever LV during the operation of the lever LV is small, and thus the durability of the lever LV can be improved which is beneficial particularly in a case where the lever LV is made of plastic.

The ratchet-side cam 13C is disposed inside the housing 10, and has flat cam surfaces 13D, as outer peripheral surfaces nonparallel to the inner peripheral surface 16C of the ratchet-side outer race 16, located in two locations on the upper side in FIG. 3. The cam surfaces 13D are arranged in positions corresponding generally to the positions of the roller retaining walls 15C. The ratchet-side cam 13C is an example of a second rotary member, and is configured as a part of the lever member 13, and thus allowed to swing together with the lever member 13.

The connection portion 13E is a member arranged to pass through the operational opening 12C of the cover member 12 so as to extend the inside and the outside of the housing 10, and to connect the ratchet-side cam 13C and the lever mount portion 13A.

The spring support portion 13G is disposed opposite to the connection portion 13E across the axis of swinging motion of the lever member 13 (coincident with the central axis of the main shaft 21), and configured to extend to the output side through the spring engaging opening 12D of the cover member 12 into the housing 10. A portion of the spring support portion 13G housed inside the housing 10 has spring engaging slits 13F formed on the laterally outer edges thereof.

The lever member 13 is mounted on the support shaft portion 21A, and a lock member 22 is fixed to the support shaft portion 21A to thereby avoid disengagement of the lever member 13 from the support shaft portion 21A. The lock member 22 is, although illustration thereof is simplified in the drawing figures, embodied for example in the form of a nut or the like to be screwed on the support shaft portion 22A.

The return spring 95 is a member formed by bending a wire rod for a spring, and includes a circular portion 95A extending in a circle with its lower end cut away, and engaging end portions 95B extending radially outward from the both ends of the circular portion 95A. The return spring 95 is housed inside the housing 10, and a radially outside thereof is entirely covered by the housing 10.

The circular portion 95A is, as shown in FIG. 7, held by the outer peripheral surface of the connection portion 13E of the lever member 13 and the outer peripheral surface of the spring retaining portion 14C of the posture restricting member 14. The engaging end portions 95B are engaged with the spring support portion 14D of the posture restricting member 14 and the spring engaging slits 13F of the lever member 13. The spring support portion 14D is standing still even when the lever member 13 makes a swinging motion, while the spring retaining slits 13F move according to the swinging motion of the lever member 13; accordingly, when the lever member 13 is caused to swing from a neutral position N, the force applied from the return spring 95 to the spring engaging slits 13F acts as a force which would cause the lever member 13 to move toward the neutral position N as shown in FIG. 7.

A description will be given of an operation of the clutch unit 1 configured as described above.

Figure 9:
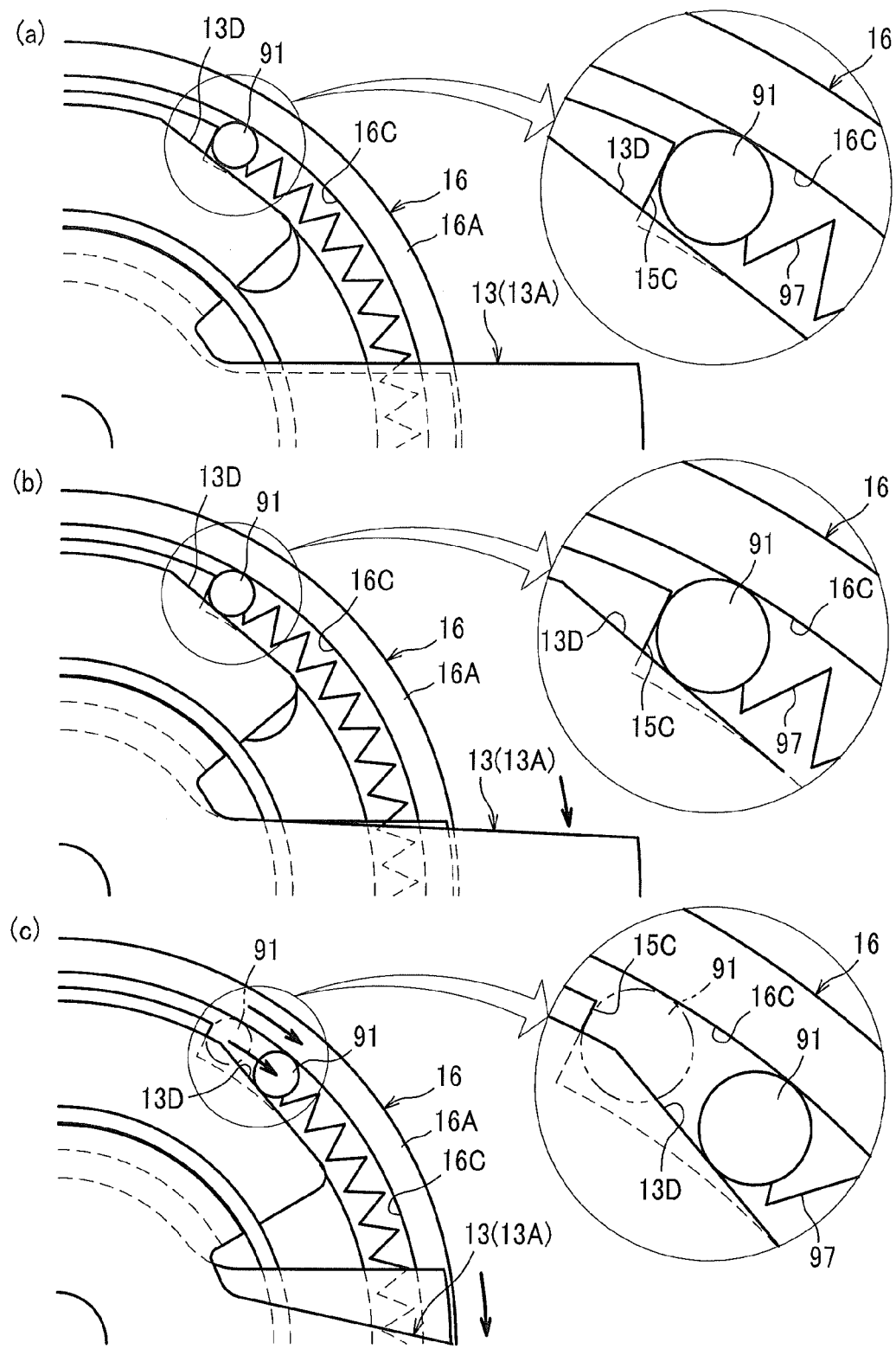
FIG. 9 includes views (a)-(c) for explaining an operation of a ratchet mechanism.

In the neutral position N shown in FIG. 9(a), as depicted in partially enlarged view, the rollers 91 are located between the inner peripheral surface 16C of the ratchet-side outer race 16 and the cam surface 13D of the lever member 13, but with a slight clearance being provided between them, and thus not held therebetween. The rollers 91 are pressed against the roller retaining walls 15C by the spring 97.

As shown in FIG. 9(b), as the lever LV is swung down, the cam surface 13D rotates clockwise and comes in contact with the roller 91, with the result that the roller 91 gets held between the inner peripheral surface 16C and the cam surface 13D. Consequently, the ratchet-side outer race 16 and the lever member 13 are rendered conjointly rotatable.

Accordingly, as shown in FIG. 9(c), as the lever member 13 is turned further clockwise, the ratchet-side outer race 16 and the lever member 13 kept in a combined state rotate clockwise. In this way, the input torque which causes the lever member 13 to rotate is transmitted to the ratchet-side outer race 16.

When the lever LV is returned from a position lower than the neutral position N to the neutral position N, the lever member 13 rotates counterclockwise from the state of FIG. 9(c) or (b), thus, the cam surface 13D retreats from the roller 91 in the counterclockwise direction, and the roller 91 fails to be held between the cam surface 13D and the inner peripheral surface 16C; therefore, the lever member 13 rotates toward the neutral position N while the ratchet-side outer race 16 remains still at rest. In other words, the input torque generated when the lever member 13 is returned is not transmitted, but shut off, to the ratchet-side outer race 16. The pressing force of the return spring 95 assists the lever LV in being operated toward the neutral position N and kept in the neutral position N.

The operations of raising the lever LV from the neutral position N upward and returning the lever LV from an upper position to the neutral position N may be similar to those in the case of making a downward swinging motion as described above, and a duplicate description thereof will be omitted herein.

A description will be given of an operation of the brake mechanism 3 performed when the ratchet-side outer race 16 is caused to rotate through the operation of the lever LV as described above.

Figure 10:
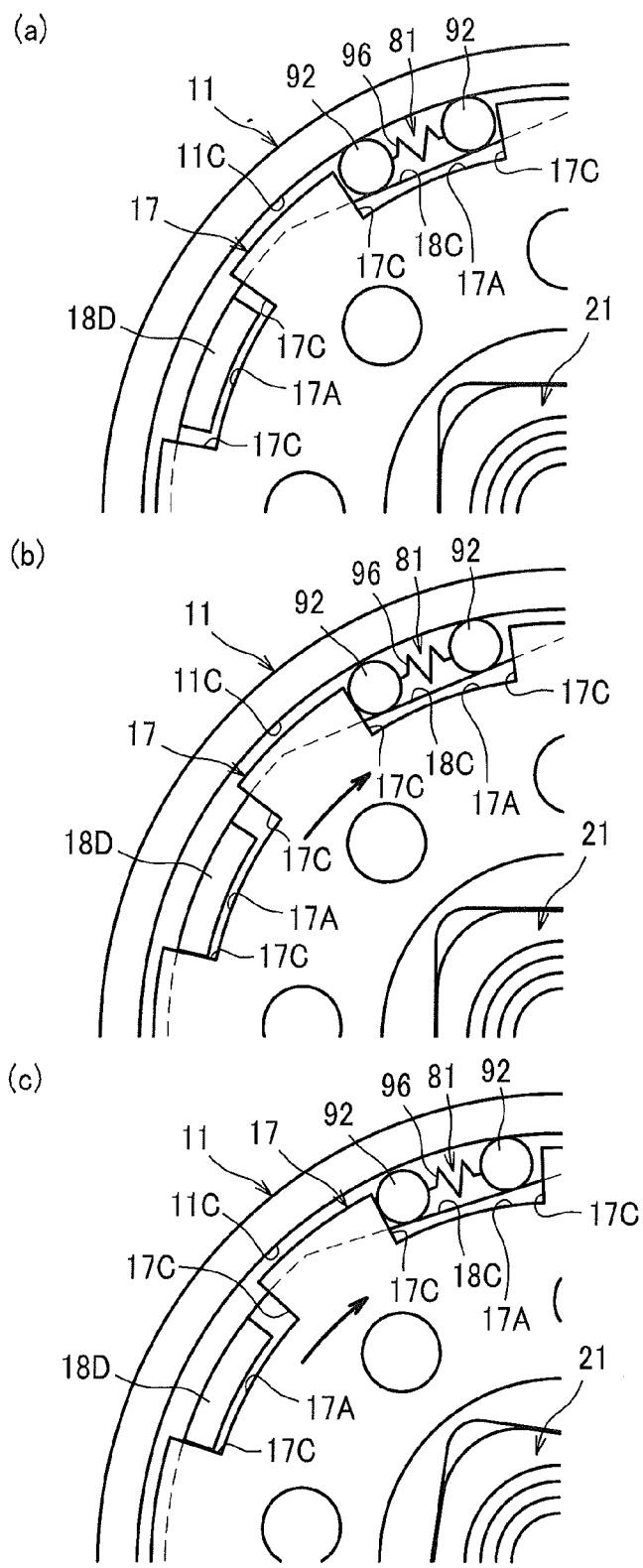
FIG. 10 includes views (a)-(c) for explaining an operation of a brake mechanism.

As shown in FIG. 10(a), before the ratchet-side outer race 16 rotates, the rollers 92 are held between the inner peripheral surface 11C of the brake-side outer race 11 and the cam surface 18C. Accordingly, the reverse input torque from the output gear 21D is shut off. At this time, the rollers 92 are slightly separated from the step riser portions 17C of the transmission member 17.

As the ratchet-side outer race 16 rotates, the transmission member 17 also rotates together with the ratchet-side outer race 16. As shown in FIG. 10(b), when the transmission member 17 makes a slight amount of clockwise rotation, the step riser portion 17C comes in contact with the roller 92, and pushes the roller 92 in the clockwise direction, so that the roller 92 held between the inner peripheral surface 11C and the cam surface 18C is released to release the brake. Thereafter, as shown in FIG. 10(c), when the lever LV continues to be lowered, the transmission member 17 is further rotated clockwise, and the first protrusion 18D and the step riser portion 17C of the recess 17A in which the relevant first protrusion 18D is received come in contact with each other in the circumferential direction. This engagement of the step riser portion 17C and the first protrusion 18D enables the transmission of input torque produced when the lever LV is lowered, to be transmitted from the transmission member 17 to the brake-side cam 18.

As the brake-side cam 18 rotates clockwise, the main shaft 21 also rotates clockwise because the main shaft 21 is combined integrally with the brake-side cam 18. When the lever LV is lowered, if the output gear 21D receives a force in such a direction as to lower the vehicle seat S, then after the brake is released, this force also serves to cause the brake-side cam 18 to rotate. When the lever LV is stopped to be lowered and returned to the neutral position N, the brake-side cam 18 will stop at a time when the rollers gets held between the inner peripheral surface 11C and the cam surface 18C.

When the lever LV is swung upward from the neutral position N, generally, the operations reverse to those in the case of making a downward swinging motion as described above may be performed so that the output gear 21D is caused to rotate.

In the brake mechanism 3 and the clutch unit 1 configured to achieve the operations as described above, the return spring 95 is disposed such that at least one side thereof that is a radially outside thereof is covered with the housing 10, and thus the risk of allowing foreign matter, such as sputter produced in welding, and dust, to be adhered to the return spring 95 can be diminished. Moreover, even when an occupant carries a string-like item, this string-like matter is highly unlikely to be entangled with the return spring 95 because the radially outside of the return spring 95 is covered with the housing 10. Therefore, the risk of obstruction to the operation of the return spring 95 which would be caused by such foreign matter is reduced, so that the operation of returning the lever LV to the neutral position N can be stably performed. As shown in FIG. 2(a), the return spring 95 has an exposed portion seen through the operational opening 12C; however, since the operational opening 12C is formed in a recess 12E which is a portion recessed from outside in the sidewall 12B of the cover member 12, foreign matter is highly unlikely to enter the housing through the operational opening 12C and adhere to the return spring 95, and string-like matter is highly unlikely to be entangled with the return spring 95.

The end portions of the return spring 95 are supported by the spring support portion 13G that is an extended portion of the lever member 13 disposed inside the housing 10, and thus adhesion of foreign matter to the end portions of the return spring 95 can be suppressed in a simple configuration. Since the member with which the return spring 95 is covered is the housing 10 which houses the rollers 91, 92, the number of parts can be reduced and the size and weight of the clutch unit 1 can be reduced, in comparison with an alternative configuration in which another dedicated housing different from the housing 10 is used.

The housing 10 is made with the outer peripheral portion 12A of the cover member 12 fitted on the outer peripheral portion 11A of the brake-side outer race 11; therefore, the outer peripheral portion 11A of the brake-side outer race 11 is reinforced by the outer peripheral portion 12A of the cover member 12. Accordingly, the brake-side outer race 11 is rendered unlikely to deform in the radially outside direction, so that the braking force can be increased.

The lever member 13 does not only have a function as a member for mounting the lever LV, but also serves as the ratchet-side cam 13C, as well as to retain the return spring 95 with the connection portion 13E and to support the both end portions of the return spring 95 with the spring support portion 13G, so that reduction in the number of parts, and associated compact and light-weight design of the clutch unit 1 can be achieved.

Taking a look now at the brake mechanism 3, engagement between the transmission member 17 and the rollers 92 is achieved by the slight protrusion of the input-side end portions of the rollers 92 from the brake-side cam 18, and engagement between the transmission member 17 and the brake-side cam 18 is achieved by the first protrusions 18D protruding from the main body portion 18A of the brake-side cam 18 toward the input-side. Accordingly, the transmission member 17 can be in the form of a flat plate which is small in dimension in the axial direction (thickness), with the result that the weight can be reduced. Since the transmission member 17 is in the form of a flat plate, it can be manufactured by blanking from a sheet material, and thus can be manufactured at low cost.

Although the embodiment of the present invention has been described above, the present invention is not limited to the above-described embodiment, and modifications and changes can be made where appropriate to the specific configurations without departing from the spirit of the present invention.

For example, the first movable piece and the second movable piece may not necessarily be rollers; the shapes may be modified without limitation as long as they are small pieces configured to be engageable with and disengageable from the inner peripheral surface of the outer race and the cam surface; i.e., they may be shaped like spheres or wedges.

In the above-described embodiment, the ratchet-side outer race is taken as an example of the first rotatory member and the ratchet-side cam is taken as an example of the second rotatory member; however, the inner peripheral surface of the outer race may be configured as a cam and the outer peripheral surface of the inner race may be cylindrical.

In the above-described embodiment, the housing 10 is configured to allow the return spring 95 to be exposed partly to the input side; however, alternative configurations may be feasible in which the lever member 13 is composed of two parts and the size of the operational opening 12C is made smaller, or another part for covering the operational opening 12C is provided, or otherwise, so that the input side of the return spring 95 is completely covered. With these configurations, the risk of adhering foreign matter to the return spring 95 can be further reduced.

In the above-described embodiment, the brake-side outer race 11 serves also as the housing 10, but this configuration may be modified without limitation, and a housing provided separately from the brake-side outer race may be used.

In the above-described embodiment, the cover member 12 is configured to restrict movement of the rollers 91 to the input side, but another part may be provided to achieve such restriction.

In the above-described embodiment, the lever mount portion 13A is configured to extend beyond the outer periphery of the housing 10 to the radially outside, but it is not required to extend to the radially outside. Furthermore, the operation member may not be in the form of a lever.

The first opening and the second opening provided in the transmission member is not necessarily configured as recesses provided on the outer periphery, but may be configured as through holes provided in radially inwardly-shifted positions. Moreover, the first opening and the second opening may be configured to be different in shape.

The engageable holes 17E are not necessarily configured as through holes, but may be holes with bottoms as long as the second protrusion 16D can engage therein. The engageable holes 17E may be differently located in positions radially outwardly-shifted from the first opening and the second opening.

The brake mechanism and the clutch unit are not only employed in the height adjustment mechanism for a vehicle seat S, but also may be applied to other devices as desired.

The invention claimed is:

1. A brake mechanism for transmitting an input torque to an output shaft and shutting off a reverse input torque from the output shaft, the brake mechanism comprising:
   a brake-side outer race having a cylindrical inner peripheral surface;
   a brake-side cam configured to be rotatable relative to the brake-side outer race, the brake-side cam having an outer peripheral surface nonparallel to the inner peripheral surface of the brake-side outer race;

a first movable piece disposed between the inner peripheral surface of the brake-side outer race and the outer peripheral surface of the brake-side cam, and configured to shut off the reverse input torque from the output shaft by getting held between the inner peripheral surface of the brake-side outer race and the outer peripheral surface of the brake-side cam; and a transmission member provided adjacent to the brake-side cam in an axial direction, allowed to come in contact with the first movable piece to thereby release the first movable piece from a state of being held between the inner peripheral surface of the brake-side outer race and the outer peripheral surface of the brake-side cam, and allowed to get engaged with the brake-side cam to thereby transmit the input torque to the brake-side cam, wherein the brake-side cam includes a plate-like main body and a first protrusion protruding from a side of the main body facing the transmission member, wherein the first movable piece is disposed to have a portion thereof protruding beyond the side of the main body facing the transmission member, and wherein the transmission member is shaped like a flat plate having a first opening configured to allow the first protrusion to be received and engaged therein and a second opening configured to allow the first movable piece to be received and engaged therein.

2. The brake mechanism according to claim 1, wherein the first opening and the second opening are each formed as a recess that opens to a radially outside of the transmission member at an outer periphery of the transmission member.

3. The brake mechanism according to claim 1, wherein the first opening and the second opening are provided respectively at two or more positions and arranged alternately in a circumferential direction.

4. The brake mechanism according to claim 3, wherein the first opening and the second opening at the respective positions are of equal length in the circumferential direction and are arranged at regular angular intervals in the circumferential direction.

5. A clutch unit comprising a brake mechanism according to claim 1 and a ratchet mechanism capable of transmitting and shutting off an input torque to the brake mechanism selectively according to an operation of an operation member, the ratchet mechanism comprising:

a first rotary member provided adjacent to the transmission member in the axial direction and configured to be engageable with and rotatable together with the transmission member;

a second rotary member configured to be swingable together with the operation member; and a second movable piece configured to be engageable with and disengageable from the first rotary member and the second rotary member to thereby transmit and shut off the input torque, wherein the transmission member has an engageable hole which opens to at least one side facing the first rotatory member, and wherein the first rotatory member includes a second protrusion engageable in the engageable hole.

6. The clutch unit according to claim 5, wherein the engageable hole is disposed in positions radially inwardly of the first opening and the second opening.

7. The clutch unit according to claim 5, wherein the first rotatory member is configured as a ratchet-side outer race made of sheet metal shaped like a cup with a cylindrical inner peripheral surface, and wherein the second rotary member is configured as a ratchet-side cam having an outer peripheral surface non-parallel to the inner peripheral surface of the ratchet-side outer race.

8. A clutch unit comprising a ratchet mechanism provided at an input side and configured to transmit and shut off an input torque produced by a swinging motion of an operation member to which a lever is mounted, and a brake mechanism according to claim 1 which is provided at an output side, wherein the ratchet mechanism includes a first rotatory member configured to be rotatable together with the transmission member, a second rotatory member configured to be swingable together with the operation member, and a second movable piece configured to be engageable with and disengageable from the first rotatory member and the second rotatory member to thereby transmit and shut off the input torque from the operation member, wherein the clutch unit comprises:

a return spring configured to return the operation member to a neutral position; and a housing covering the first movable piece, the second movable piece and the return spring from at least one side that is a radially outside thereof.

9. A clutch unit comprising a ratchet mechanism provided at an input side and configured to transmit and shut off an input torque produced by a swinging motion of an operation member to which a lever is mounted, and a brake mechanism provided at an output side and configured to transmit the input torque from the ratchet mechanism to an output shaft and to shut off a reverse input torque from the output shaft, wherein the brake mechanism includes a brake-side cam, a brake-side outer race, a first movable piece configured to be engageable with and disengageable from the brake-side cam and the brake-side outer race to thereby lock and unlock rotation of the brake-side cam, and a transmission member allowed to come in contact with the first movable piece to thereby release the first movable piece from the brake-side cam and the brake-side outer race, and allowed to get engaged with the brake-side cam to thereby transmit the input torque to the brake-side cam, wherein the ratchet mechanism includes a first rotatory member configured to be rotatable together with the transmission member, a second rotatory member configured to be swingable together with the operation member, and a second movable piece configured to be engageable with and disengageable from the first rotatory member and the second rotatory member to thereby transmit and shut off the input torque from the operation member, wherein the clutch unit comprises:

a return spring configured to return the operation member to a neutral position; and a housing covering the first movable piece, the second movable piece and the return spring from at least one side that is a radially outside thereof, wherein the housing doubles as the brake-side outer race, wherein the housing comprises:

the brake-side outer race configured to cover an output-side surface of the first movable piece and to cover a radially outer side of the brake-side cam and the first movable piece; and a cover member configured such that an inner peripheral surface of the cover member is fitted directly on an outer periphery of the brake-side outer race, the cover member being configured to cover an input-side surface of the second movable piece,
wherein the operation member includes:
the second rotary member located within the housing;
a lever mount portion disposed outside the housing and to which the lever is mounted; and
a connecting portion to connect the second rotary member and the lever mount portion and disposed to extend through an opening provided in the housing, wherein the second rotary member, the lever mount portion, and the connecting portion are formed integrally in one piece;
wherein the return spring is held by the connecting portion.

10. The clutch unit according to claim 9, wherein the cover member is configured to restrict movement of the second movable piece toward the input side.

11. The clutch unit according to claim 9, wherein the lever mount portion is configured to extend to a radially outside position beyond the outer periphery of the housing.

12. The clutch unit according to claim 9, wherein the operation member includes a spring support portion disposed inside the housing, on a side opposite to the connecting portion with respect to an axis of a swinging motion thereof, and
wherein both ends of the return spring are retained on the spring support portion.

13. The clutch unit according to claim 9,
wherein the brake-side outer race has a cylindrical inner peripheral surface,
wherein the brake-side cam is configured to be rotatable relative to the brake-side outer race, the brake-side cam having an outer peripheral surface nonparallel to the inner peripheral surface of the brake-side outer race, wherein the first movable piece is disposed between the inner peripheral surface of the brake-side outer race and the outer peripheral surface of the brake-side cam, and configured to shut off the reverse input torque from the output shaft by getting held between the inner peripheral surface of the brake-side outer race and the outer peripheral surface of the brake-side cam, wherein the transmission member is provided adjacent to the brake-side cam in an axial direction, allowed to come in contact with the first movable piece to thereby release the first movable piece from a state of being held between the inner peripheral surface of the brake-side outer race and the outer peripheral surface of the brake-side cam, and allowed to get engaged with the brake-side cam to thereby transmit the input torque to the brake-side cam, wherein the brake-side cam includes a plate-like main body and a first protrusion protruding from a side of the main body facing the transmission member, wherein the first movable piece is disposed to have a portion thereof protruding beyond the side of the main body facing the transmission member, and wherein the transmission member is shaped like a flat plate, and includes a first opening configured to allow the first protrusion to be received and engaged therein and a second opening configured to allow the first movable piece to be received and engaged therein.

* * * * *